US006158899A

United States Patent [19]

Arp et al.

[11] Patent Number: 6,158,899

[45] Date of Patent: Dec. 12, 2000

[54] METHOD AND APPARATUS FOR ALLEVIATING ESD INDUCED EMI RADIATING FROM I/O CONNECTOR APERTURES

[75] Inventors: Ronald K Arp, Greeley; Matthias A Lester, Fort Collins; David A Eckhardt, Bellvue, all of Colo.

[73] Assignee: Hewlett-Packard Company, Palo Alto, Calif.

[21] Appl. No.: 09/238,687

[22] Filed: Jan. 27, 1999

[51] Int. Cl.[7] .......... G02B 6/36

[52] U.S. Cl. .......... 385/53

[58] Field of Search .......... 385/53

[56] References Cited

U.S. PATENT DOCUMENTS 5,005,939 4/1991 Avanitakis .......... 350/96.2

*Primary Examiner*—Frank G. Font
*Assistant Examiner*—Reginald A. Ratliff
*Attorney, Agent, or Firm*—Edward L. Miller

[57] ABSTRACT

A solution to the problem of I/O card faults caused by spurious RF energy induced by ESD related currents in the vicinity of an aperture in a chassis is to reduce the efficiency of the radiating antenna created by the aperture and decouple any remaining spurious RF energy from any would-be receiving antenna in the I/O card. A conductive boot covers the I/O cable as it emerges from the chassis. The boot is physically attached and AC coupled (as well as probably ohmically connected) to the chassis at one end and tapers down to a small aperture at a distal end to permit egress of the I/O cable. The aperture at the distal end is considerable smaller than the aperture at the chassis, which is no longer visible to ESD induced currents anyway, since its edge has been replaced by the surface of the boot. The smaller aperture is a less efficient antenna at the frequencies of interest and it is now further removed from components that might act as receiving antennae. The intervening length of the conductive boot also acts as a filter to obstruct passage of the reduced amount of spurious RF energy that still does radiate from the small aperture toward the I/O card. The boot may be of metal, or of plastic that has been coated with a suitable conductive paint on its inner surface.

14 Claims, 1 Drawing Sheet

METHOD AND APPARATUS FOR ALLEVIATING ESD INDUCED EMI RADIATING FROM I/O CONNECTOR APERTURES

BACKGROUND OF THE INVENTION

Both governmental regulation and the expectation of the general community of users continue to make resistance to ESD (Electro-Static Discharge) induced failure a necessary, or at least desirable, property of many categories of consumer and commercial equipment. The same is true for conducted and radiated EMI (Electro-Magnetic Interference). Computers and their peripherals are such a category. A common way of characterizing such resistance to ESD and testing for regulatory compliance is to "zap" the equipment with a device that simulates an ESD event. (The sound of the word "zap" is thought to suggest the sound of arcing, or of a spark.) For example, a standard value of capacitance may be charged to a selectable value of high voltage (say, from one to twenty thousand volts) and then discharged through a standard fixed amount of resistance when in contact with arbitrary locations on the DUT (Device Under Test). Generally speaking, surviving encounters with a zapper charged to higher voltages require more extensive protection in the DUT, and is more difficult to provide than that needed for zaps of lower voltage.

It is common for peripherals and their controllers (usually a computer) to have I/O (Input/Output) circuit boards that act as interfaces between a transmission medium, such as twisted pair, coaxial cable or a fibre optic cable. The transmission medium attaches to the I/O card with a suitable connector. The I/O card itself is generally removable once a metallic I/O slot cover, or interface plate, is itself removed. The connector for the transmission medium interconnects the I/O card to the transmission medium through an aperture in the metallic I/O slot cover (interface plate). A favorite place to zap the equipment is in the vicinity of such apertures. The resulting failures can range from the genuine physical damage of destroyed semiconductor junctions and overcooked resistances to mere temporary errors in operation caused by transitory disturbances to data and control signals.

The image that most often comes to mind when considering damage from ESD is what happens when someplace other than a "good solid ground" is zapped, say a signal pin of an IC (integrated circuit) as compared to an enclosing chassis that is itself connected to an earth safety ground. An enclosing metallic chassis is often compared to a Farady cage, or an electrostatic shield, which if well constructed, it is. Many voltage sensitive techniques have been developed to deal with zapping individual pins of an IC. It is recognized that in either case the peak currents involved can be substantial, even if brief; say, in the range of several amperes. Under the right circumstances, those high currents can cause trouble with zaps applied in the vicinity of necessary apertures in a real world chassis that is expected to play the role of a Farady cage.

Consider the case where an I/O connector transits an enclosing chassis through an aperture. The part of the chassis of interest here is frequently formed from a metallic interface plate. The aperture is in the interface plate. Inside the chassis the connector makes signal connections to the I/O card, and outside the chassis the connector serves as an anchor and strain relief for the cable that is the transmission medium. The connector may have a shell, but owing to issues relating to mechanical tolerances, among other things, it is common for the shell not to be anchored to the chassis or to the interface plate, but to the I/O card itself This is all the more likely when the transmission medium is fibre optic cables, and all the mating connector shells and boots, etc., are formed of plastic. Arcing from the interface plate to these plastic parts during a zap, it turns out, is not a troubling problem that needs to be solved. And even if such were thought likely, there are well known techniques for protecting the circuitry on the I/O card; e.g., guard rings, zener diodes and voltage triggered SCR's, etc.

All of that said, we discovered that a fibre optic connection as described was indeed susceptible to ESD induced failures. It was discovered that the aperture can act as an antenna effective at frequencies that are significant components of the current impulse produced by the zap. Radiating RF energy from that antenna (radiated EMI) couples into the circuitry of the I/O card. (In our case it seems to have a special fondness for the photo-diodes in the fibre optic transceiver, although it seems clear that, depending upon geometry, any component could be a receiving antenna.) This spurious energy loosed upon the I/O card causes it to fault in generally unpredictable ways, similar to what might be expected if there were severe trash on the power supply. What to do?

SUMMARY OF THE INVENTION

A solution to the problem of I/O card faults caused by spurious RF energy induced by ESD related currents in the vicinity of an aperture in the chassis is to reduce the efficiency of the radiating antenna created by the aperture and decouple any remaining spurious RF energy from any would-be receiving antenna in the I/O card. These goals may be met by the placement of a conductive boot over the I/O cable as it emerges from the chassis. The boot is physically attached, AC coupled to (and preferably ohmically connected to) the chassis at one end and tapers down to a small aperture at a distal end to permit passage of the I/O cable. The aperture at the distal end is considerably smaller than the aperture at the chassis, which is no longer visible to ESD induced currents anyway, since its edge has been replaced by the surface of the boot. The smaller aperture is a less efficient antenna at the frequencies of interest (say, in the range of 500 MHZ to 5 GHz) and it is now further removed (say, by two to three inches) from components that might act as receiving antennae. The intervening length of the conductive boot also acts as a waveguide below cutoff to obstruct or attenuate passage of whatever reduced amount of spurious RF energy that still might radiate from the small aperture toward the I/O card. This combination greatly diminishes the sensitivity of the I/O card to ESD related faults caused by currents in the vicinity of chassis apertures. For example, we observed a configuration as described which initially failed at 2 KV (4 KV being required), but that with the conductive small apertured boot does not fail until 15 KV. The boot may be of metal, or of plastic that has been coated with a suitable conductive paint on its inner surface, outer surface, on both. The plastic might likewise be plated with a conductor, or simply be conductive plastic to begin with.

The method may be summarized as first electrically relocating an aperture away from a victim circuit, while the victim circuit remains physically proximate the actual physical aperture. This may be done by connecting the perimeter of the aperture a tubular conductive surface extending in a direction away from the victim circuit. The general cross section of the tubular surface may be circular, irregularly round, square or rectangular. The tubular conductive surface may have an axis that is perpendicular to the plane of the physical aperture, and is topologically similar to a tube or cylinder closed at its distal end, or to a cone. That is, it either tapers toward the distal end, is capped or enclosed at that distal end, or both. At the distal end of the conductive surface is a small aperture sized to allow passage of necessary cabling. This is the electrically relocated aperture. The original physical aperture is no longer visible electrically, since it is no longer at the boundary of a conductive region. Since the relocated electrical aperture can be smaller than the actual physical aperture, it radiates less RF energy in the first instance. Second, the intervening conductive surface is sized to act as an obstruction in the path of RF energy radiating from the reduced size electrical aperture and toward the victim circuit. In particular, it may function as a waveguide below cutoff attenuator. If desired, waveguide techniques could be employed to interposed either a band reject filter or a high pass filter between the relocated electrical aperture and the victim circuit.

DESCRIPTION OF A PREFERRED EMBODIMENT

Figure 1:
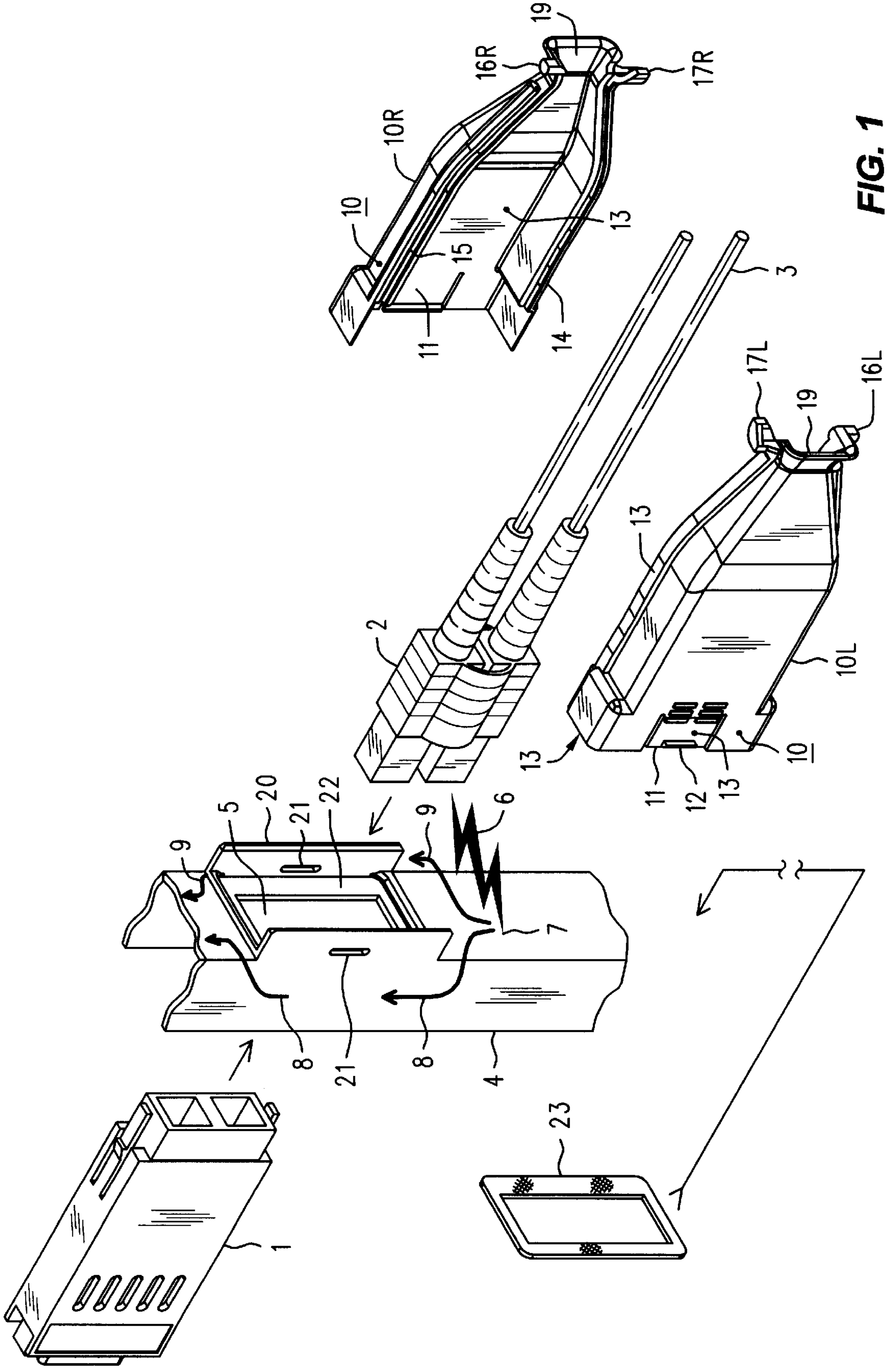
FIG. 1 is a simplified exploded perspective view of an I/O card, interface plate, I/O cable and conductive boot that alleviates faults produced in the I/O card by EMI induced by ESD occurring at the interface plate.

Refer now to FIG. 1, wherein is shown a simplified exploded perspective view of an I/O card 1, interface plate 4, I/O cable 3 and conductive boot 10. The I/O card 1 is contained within a device that communicates via the I/O cable 3 with another device. Neither device is shown, but it will be readily understood that one device might be a computer and the other a peripheral, such as a disc drive. The devices may also both be computers connected to a LAN (Local Area Network). The device containing the I/O card 1 has an enclosing chassis, of which (removable) interface plate 4 forms a part when it is secured in place. The larger chassis itself is not shown, but it will be readily appreciated that it includes a rectangular opening that receives the interface plate, and that there is some mechanism (not shown), such as captive thumbscrews, that allows the interface plate to be attached to the chassis. The interface plate 4 is removable, of course, so that the I/O cards behind it (we have shown only one—there might be several) can be removed and serviced.

A pair of fibre optic cables 3 terminates in a plug assembly 2. Plug assembly 2 mates with I/O card 1. To do so it passes through an aperture 5 in interface plate 4. It will be appreciated that in our exploded view we have spread things apart. The reader will have no difficulty understanding that in operation a socket end of the I/O card is located approximately in the plane of the aperture 5, so that, when connected, most or all of the actual plug portion of plug assembly 2 has passed through the aperture 5 and into the corresponding sockets of the I/O card 1.

At this point we have described a conventional fibre optic interface. In particular, it is the fibre channel interface, a standard for communication with peripheral devices developed by Hewlett-Packard Co. It could as well have been for FDDI in a networked computer environment; the figure would be almost identical. It will be appreciated that in an actual instance using an existing fibre channel fibre optic transceiver and plug assembly, everything in the vicinity of the aperture 5 in the interface plate 4 is some species or another of plastic, rubber or glass. There is not much that is conductive there, save for the interface plate 4 itself and the chassis. So, it comes as a somewhat rude shock to discover that modest ESD discharges (represented by tiny lightning bolt 6) applied to the vicinity of the aperture 5 in the interface plate 4 (say, at location 7) causes the I/O card 1 to fault (but not to be damaged). The first thought is that the ESD must be arcing over into the I/O card, despite the insulative barriers and the Farady cage effect of the chassis and interface plate 4.

Upon investigation it was discovered that arcing (or charge transfer) was not the culprit. That was good news, in a way, since better insulation would be akin to making something already quite good be a whole lot better. The task of improving the insulation would involve a lot of effort for little actual improvement. Besides which, the fibre optic transceiver was a third party's completed commercial design already on the market, and getting it changed was beyond our reach.

The failure mechanism turned out to be that fast rising currents (the testing regime calls for the zap to have a one nanosecond rise time) were dividing around the aperture 5 and causing it to act as an antenna and radiate RF energy. [This phenomenon, while not widely known, is nevertheless appreciated and understood by those skilled in the art of EMC (Electro-Magnetic Compatibility), where it has often been called "shock excitation of an aperture". It can be shown that the shape of the aperture and the division around the aperture of the current density arising from an ESD event all influence the resulting radiation from the aperture. The subject is complicated, but we needn't get stuck in a messy analysis of why it happens, since it is already understood, and all we need to appreciate is that it does happen.] Some of that RF energy radiated from the aperture would propagate toward the fibre optic transceiver 1, where components therein acted as receiving antennae. The resulting induced voltages from that received RF energy caused the mischief. So it wasn't susceptibility of the I/O card 1 to ESD per se, that was the trouble; the trouble was related to radiated EMI. There appear to be two approaches to fixing the problem: reducing the sensitivity of the transceiver to EMI (a noble task, to be sure, but outside the scope of our project) and reducing the amount of EMI in the first instance. We chose the latter approach.

Those who are familiar with antenna theory will appreciate that if there were no aperture, there would be no radiated RF energy (at least not as an isolated event from that spot in the interface plate 4). Clearly, the actual aperture 5 cannot be eliminated in a physical sense and still accommodate use the fibre optic transceiver I/O card 1, as intended. But the aperture can be electrically relocated away from the victimized circuitry, and its size reduced. The size reduction of the relocated aperture is significant, as it reduces the amount of radiated RF in the first instance. The relocation is valuable, as it allows the interposition of an obstruction to RF energy radiating from the smaller aperture toward the victim circuit.

To continue then, note housing or boot 10, which is composed of sections (left and right halves) 10R and 10L. Boot 10 may be formed of plastic and suitably coated with a conductive paint, as described below, or in may be formed of metal to begin with. It may be formed of conductive plastic, or of non conductive plastic that has been plated with a conductor. In any event, when assembled the two halves 10R and 10L are brought together to form a generally tubular conductive surface that encloses the plug assembly 2, has a cross section at one end 18 that generally matches the size and shape of the aperture 5, makes electrical contact with perimeter of that aperture 5 (causing any physical aperture at that location to electrically vanish). While it is preferred that the end or edge 18 make ohmic contact with the perimeter of aperture 5, such is not required, provided there is at least reasonable AC coupling therebetween. (This is analogous to a DC block in the waveguide art.) Boot 10 tapers down at a distal 2 end to a small aperture 19 sized to permit passage of the fibre optic cables 3. The length and cross section of the boot 10 operates as a waveguide below cutoff attenuator for frequencies below, say, 5 GHz.

Once the two halves 10R and 10L are assembled into the completed boot 10 the whole works is held in place by seating the end 18 into conductive flange assembly 20, which may be of machined, stamped, folded or die cast metal. Flange 20 may be bolted, screwed, riveted or spot welded to the interface plate 4. End 18 of boot 10 seats onto surface 22. Two slots 21 in the sides of the flange 20 receive barbs 12 located on flexible tangs 11. The barbs snap into the slots and hold the boot 10 in place, with the end 18 against surface 22. It may be desirable for there to be an intervening thin RF gasket 23 between end 18 and surface 22.

A conductive coating 13 of copper bearing paint has been applied to the interior surfaces of halves 10L and 10R, as well as to the surface of end 18 and the outer sides of flexible tangs 11 and barbs 12. This conductive coating 13 is in good electrical contact with interface plate 4 when the assembled boot 10 is seated into flange 20.

As an alternative to flange 20, a pair of ears (not shown) may be formed out of material in the interface plate 4 that would otherwise be punched out to form aperture 5. These ears may be folded outwards to be parallel and occupy the same general location as slots 21. The ears may have the same slots therein, and thus hold the boot 10 in place.

In our example, mating halves 10R and 10L are identical, much as the old GR 874 "sexless" coaxial connector interconnected with other instances of themselves. This has the advantage that only one molded part need be produced, and that any two parts combined to form a whole, so that individual left handed and right handed parts need not be kept track of in pairs. Our parts do not require fasteners either, such as screws or bolts passing through mating flanges, although such designs are feasible and would be entirely satisfactory. Instead, at the distal end near the small aperture 19 our halves each have a pair of complementary shaped inter-twining lugs: 16L /16R and 17L /17R. The left half 10L has post-like lug 16L and socket-like lug 17L, while the right half 10R has post-like lug 16R and socket-like lug 17R. In operation, the post-like lugs 16L/R engage their respective socket-like lugs 17L/R. This holds together the halves 10L and 10R at the end of the boot having the small aperture 19. The other end 18 is held together by the those forces at flexible tangs 11 and barbs 12 that also hold the entire boot 10 in place against the interface plate 4.

Note also that the right half 10R has a ridge, or tongue, 14 along its lower edge, while there is a complementary recess, or groove, 15 along the top edge. The other half 10L has corresponding features (although they are not visible in the drawing). These are a tongue 14 on its top and a groove 15 on its bottom. The conductive coating 13 extends into all these tongues and grooves, also.

Here are the approximate dimensions of the interface plate 4 and conductive boot 10 described above and shown in FIG. 1. The aperture 5 measures about 0.5" by 1.375". The flange 20 is about 2" long and it two extended sides are about 0.875" apart, inside to inside. The interior cross section in the vicinity of the tongue and groove near the end 18 is about 0.75" by 1.25". The length of the generally untapered section, starting with end 18, is about 1.75"; from the start of the taper to the small aperture 19 is about 1". The small aperture is about 0.25" by 0.375".

The dimensions given above comport well with the stated desire to obstruct propagation of frequencies in the range of 500 MHZ to 5 GHz. The untapered cross section has dimensions comparable to J band rectangular waveguide: 1.372"×0.622". J band is used for 1.9 GHz to 3.5 GHz, with an absolute cutoff frequency of 4.285 GHz. Recalling that the risetime of the zap is specified to be one nanosecond, the fundamental frequency, and the one of greatest interest, is 1 GHz. So, it and its second through fourth harmonics are definitely eliminated, and the fifth is only marginally passed, since it is not until X band that 5 GHz is officially part of the pass-band. Our boot is of much larger cross section than X band (which is 0.9"×0.4"). Thus, our conductive boot 10 is an effective waveguide below cutoff attenuator for the frequencies of interest. If greater attenuation is desired, the boot 10 can be made longer.

The waveguide below cutoff formed by the length and cross section of the boot 10 is between the original aperture 5 and the electrically relocated smaller aperture 19. In the particular case described above the area reduction from the original aperture to the electrically relocated smaller aperture is greater than seven to one, which is very significant, as it is accompanied by a corresponding reduction in radiated EMI from that smaller aperture 19 in the first instance. It is, of course, that smaller amount of radiated EMI that is attenuated by the intervening waveguide below cutoff, so what reaches the victim circuitry in the I/O card 1 is doubly reduced.

And now for some concluding remarks. The conductive boot can be fabricated in other ways. It might be of stamped metal halves. These halves could be identical interlocking parts, as shown, be of left and right species, be non-interlocking and fastened together with screw, clips or small bolts, or even clamped together with an elastic band. The boot could also be a unitary object that is either molded plastic (coated with a conductor) or deep drawn metal. In this case the boot would likely be placed over the transmission medium (cable/s) before the I/O connectors are assembled to the cable. This might not be as bad as it sounds, since the boots are not expensive to manufacture, and this way they cannot be lost or misplaced, and may be more likely kept in service. Also, the absence of a seam where two halves join would improve its attenuation. It will also be noted that a plastic part could be conductively coated on either the inside or the outside, or both.

The boot 10 when have shown snaps into place against a flange that is part of the interface plate. Other mounting schemes are possible. Instead of barbs interlocking with slots, the boot could have ears carrying holes for screws to affix the boot to the flange. A washer-like backing plate could slip over the boot to rest against an outward projecting ridge near end 18, and be urged by screws against the interface plate, thus fastening the boot. A ridge around the end 18 of the boot could engage an array of flexible spring fingers on the interface plate, so that the boot snaps onto the interface plate rather like two snap fasteners on a shirt or jacket.

The boot might have a circular cross section, with a conical tapering section.

We claim:

1. A method of alleviating ESD induced EMI radiating from an aperture in a chassis, the aperture traversed by a fibre optic cable and the ESD induced EMI radiating toward EMI sensitive circuitry enclosed by the chassis, the method comprising the steps of:

electrically relocating the aperture in a direction away from the EMI sensitive circuitry by attaching to the outside of the chassis a conductive surface at the perimeter of the aperture therein, the conductive surface extending in the direction away from the EMI sensitive circuitry and having a distal edge that forms the electrically relocated aperture;

reducing the amount of radiating EMI induced by ESD by sizing the electrically relocated aperture to be smaller than the aperture in the chassis;

routing the fibre optic cable through the electrically relocated aperture of reduced size; and attenuating ESD induced EMI that is radiating from the electrically relocated aperture and toward the EMI sensitive circuitry by sizing the conductive surface that intervenes between the aperture in the chassis and the electrically relocated aperture to be a waveguide that does not support propagation of that radiating EMI.

2. Apparatus alleviating ESD induced EMI radiating from an aperture in a chassis, the aperture traversed by a fibre optic cable and the ESD induced EMI radiating toward EMI sensitive circuitry enclosed by the chassis, the apparatus comprising:

a chassis having an aperture and enclosing EMI sensitive circuitry proximate the aperture;

a fibre optic cable connected to the EMI sensitive circuitry and passing through the aperture; and a conductive boot having an edge that abuts against the perimeter of the aperture in the chassis, that extends in a direction away from the EMI sensitive circuitry, that has at a distal end an aperture smaller than the aperture in the chassis, and that does not support propagation of EMI radiated from the smaller aperture toward the EMI sensitive circuitry.

3. Apparatus as in claim 2 wherein the conductive boot is of plastic having a conductive coating.

4. Apparatus as in claim 3 wherein the conductive coating comprises conductive paint.

5. Apparatus as in claim 3 wherein the conductive coating comprises plating.

6. Apparatus as in claim 2 wherein the conductive boot is of conductive plastic.

7. Apparatus as in claim 2 wherein the conductive boot is of metal.

8. Apparatus as in claim 2 wherein the conductive boot comprises two interlocking and identical halves.

9. Apparatus as in claim 2 wherein the chassis further comprises an interface plate, the aperture in the chassis is located in the interface plate, the interface plate includes a flange having slots, and the conductive boot includes barbs that engage the slots.

10. Apparatus as in claim 2 wherein the conductive boot is of a generally rectangular cross section in a first part that abuts the aperture in the chassis, and of a diminishing rectangular cross section in a second part that tapers from the first part toward the smaller aperture.

11. Apparatus as in claim 2 wherein the conductive boot is generally conical in shape.

12. Apparatus as in claim 2 wherein the apparatus includes an RF gasket disposed between the edge and the chassis.

13. A boot for a fibre optic cable interface that alleviates ESD induced EMI radiating from an aperture in a chassis, the boot comprising a conductive surface having a first edge forming a first aperture, the conductive surface being AC coupleable at the first edge to the perimeter of the aperture in the chassis, and having a second edge forming a second aperture smaller than the first and for passage of a fibre optic cable, the first and second apertures being separated by a waveguide below cutoff for a selected frequency.

14. A boot as in claim 13 wherein the conductive surface is comprised of two identical interlocking halves.

* * * * *